United States Patent Office 2,933,413
Patented Apr. 19, 1960

2,933,413

CREOSOTED WOOD COATED WITH A FURFURYL ALCOHOL POLYMER

Irving S. Goldstein, Pittsburgh, Pa., assignor to Koppers Company, Inc., a corporation of Delaware No Drawing. Application January 2, 1958
Serial No. 706,575

6 Claims. (Cl. 117—72)

This invention relates to the sealing of creosoted wood, to the resinous coating composition by which said sealing is obtained, and to the sealed creosoted wood products resulting therefrom. In its more specific aspect the invention relates to a method of providing a sealer coating for creosoted wood and for coating the creosoted wood with a sealer through which neither paint nor creosote will penetrate.

Creosote, which is intended in a generic sense to designate wood preservative substances derived from tars and pitches of all types, has highly desirable wood preserving properties; it imparts, however, an oiliness and an odor to wood which limits its uses.

Prior methods of applying a coating to a creosoted wood, for both decorative purposes and to prevent penetration or bleeding of the creosote through such coating have had the disadvantages that several layers of the coatings have had to be applied to prevent bleeding and further that the pot life of such coatings has made their application in the field impracticable or uneconomical. When, for example, a phenol-formaldehyde resin is employed a curing time of at least forty-eight hours is required before the coated object can be painted. Additionally, several applications of this resin are required to effect an adequate seal.

Briefly stated, my invention consists fundamentally in the preparation, as a novel coating material, of a secondarily polymerized furfuryl alcohol prepared by catalytically further polymerizing a furfuryl alcohol polymer by the addition of hereinafter-described secondary catalysts. My invention also comprehends the method of applying the said novel coating at substantially the same time as it is prepared, and a product thereof consisting of creosoted wood sealed by said coating so as to prevent the bleeding of creosote oils. The wood product can be painted and the applied paint layer will not be attacked by exuded oils. A product of my invention having outstanding characteristics of long life and weatherability consists of creosote-protected wood, sealed by my sealer coating material which contains an extender such as carbon black, silicon dioxide, titanium dioxide or other similar materials.

The secondary catalysts useful in this invention are phosphoric acid, hydrated oxalic acid and paratoluene sulfonic acid. These catalysts when added in an amount of from 1.5–20 percent by weight of the resin are of sufficient hydrogen ion concentration to catalyze the polymerization of the resin in a reasonable time but not such as will permit the reaction to go out of control or cause a harmful shortening of the pot life of the resin.

In contrast to the method above-mentioned, catalyzed furfuryl alcohol resins found effective in the present process, can be cured in a considerably shorter period, i.e. three hours, to a consistency which can be readily further processed. When compared to periods of 48 hours or longer required in the previously-mentioned process, this reduction in time is of considerable significance. Additionally, a single 10 mil coat of the secondarily catalyzed resin of my invention adequately seals the creosoted wood, whereas several coats of a phenol-formaldehyde resin are required. Noteworthy, is the fact that a single coat of my secondarily catalyzed furfuryl alcohol resin is a far more effective sealer than a number of phenol-formaldehyde resin coatings.

Typical, but not limitative of the type of furfuryl alcohol resins contemplated by this invention, are those in which the resin-forming polymerization is catalyzed by phosphoric acid or zinc chloride. Exemplary of the latter, the zinc chloride catalyst type, is the following: 2000 grams of a solution consisting of 1920 grams of furfuryl alcohol to which zinc chloride dissolved in water has been added was placed in a two-liter resin pot. The amount of zinc chloride used is sufficient to yield a solution of from 1.0–10 percent by weight of the total furfuryl alcohol solution. Applicant has found that a 2 percent solution yields optimum results. The pot is covered and placed in a thermostatically controlled oil bath. The resin pot is fitted with a stirrer and a condenser arranged so that the condensate, principally water, is not returned to the reaction vessel. An aspirator is also connected to the system.

A temperature of 50°–100° C., but preferably 70° C., is maintained in the resin pot. The absolute pressure of the system is maintained at approximately 500 millimeters of mercury by bleeding air into the aspirator line. This vacuum, which is not essential, is maintained in order that the polymerization proceed smoothly. Heating is continued until a desired viscosity, which depends upon the use for which the resin is intended, is reached and the resin is then rapidly cooled. To prevent further condensation of the resin during storage an aqueous solution of ethylene diamine is added in an amount that will substantially neutralize the resin. The resin may be stored in this condition for long periods of time with no ill effects. A resin prepared according to the above procedure will hereinafter be referred to as a type A resin.

Still another type of furfuryl alcohol resin useful in the present invention is that described in applicant's co-pending application Serial No. 594,090 which matured into U.S. Patent 2,909,450, issued October 20, 1959. A resin of this type is prepared by dissolving from 0.5–10 percent of a catalyst, either the nitrate of cadmium, cobalt, nickel or zinc, or the chloride of zinc, in water to form a 0.5–19.5 percent solution. This solution is then mixed with from 0–25 percent furfural and 65–99 percent furfuryl alcohol to obtain a homogeneous stable polymer. The above percentages are all by weight of the total solution. Use of this resin offers the additional advantage of autostability.

Dilution of the resin to a workable consistency may be accomplished by various solvents such as methanol, acetone, methylethyl ketone, furfuryl alcohol, etc., and combinations thereof. That amount of solvent is used which will give the resin a consistency that is suitable for a selected method of application.

The secondary or curing catalyst may be dissolved in the solvent prior to its addition to the resin or may be separately added thereto. In no case, however, is the secondary catalyst to be added to the resin until the resin is to be used.

The advantages of the invention will be better understood from the following examples which are given by way of illustration and not limitation.

EXAMPLE I

A solution of 20 grams of type A furfuryl alcohol resin, 1.6 grams of oxalic acid, 2 milliliters of methanol and 10 milliliters of acetone was prepared. A 5-gram portion of the solution was applied by spraying on a cedar test specimen. The specimen was dried for 2 hours, then painted with a white house paint. After drying the sample was placed in an Atlas twin arc weatherometer. The cycle used in the weatherometer was a 17-minute arc to obtain a temperature of 140° F., then a 3-minute arc with a tap water spray. Upon completion of 4800 hours testing, the sample was found to be unaffected.

The above example was repeated varying the amount of catalyst used and the amount of type of solvent. The results of these tests as set forth in the table below established conclusively that the painted resin of the invention yields a protective coating of superior qualities.

*Table I*

| No. | Resin Mixture | Wt. of Resin in (g.) | Film Thickness (mils) | Percent Catalyst Concentration | Method of Application |
|---|---|---|---|---|---|
| 1 | 20 g. furfuryl alcohol+1.6 oxalic acid +2 ml. methanol+10 ml. acetone. | 5 | 10 | 8 | Spray. |
| 2 | Same as above except 3.2 g. oxalic acid. | 5 | 10 | 16 | Do. |
| 3 | 20 g. furfuryl alcohol+1.6 g. oxalic acid+2 ml. methanol+10 ml. methylethyl ketone. | 5 | 10 | 8 | Do. |
| 4 | Same as above except 3.2 g.oxalic acid. | 5 | 10 | 16 | Do. |
| 5 | 20 g. furfuryl alcohol+1.6 g. oxalic acid+12 ml. acetone. | 5 | 10 | 8 | Do. |
| 6 | Same except 3.2 g. oxalic acid. | 5 | 10 | 16 | Do. |
| 7 | 20 g. furfuryl alcohol+3.2 g. oxalic acid+1 ml. furfural+11 ml. acetone. | 5 | 10 | 16 | Do. |
| 8 | 20 g. furfuryl alcohol+2.4 g. oxalic acid+5 ml. methanol. | 5 | 10 | 12 | Brush. |
| 9 | 20 g. furfuryl alcohol+2.4 g. oxalic acid+5 ml. acetone. | 5 | 10 | 12 | Do. |

EXAMPLE II

A solution consisting of 5 milliliters of methanol and 7 milliliters of acetone was added to 20 grams of type A resin. Sufficient oxalic acid was added to give a catalyst concentration of 16% by weight of the resin. Silicon dioxide in the amount of 5 grams was then mixed into the solution. After mixing a portion of the solution was sprayed over a cedar test specimen. This specimen was then tested for weatherability by placing it in an Atlas twin arc weatherometer where it was kept until 50 percent of the coating was removed. The cycle used in the weatherometer was the same as that used in Example I. The time required for the 50 percent removal was 1875 hours. The above clearly shows the superior weathering qualities of the invention.

In order to demonstrate the utility of other extenders at various concentrations several more experiments were run varying only in the extender used and the concentration thereof. The results are summarized in Table II below:

*Table II.—The effects of weathering on furfuryl alcohol and extended furfuryl alcohol resin coatings*

| Example No. | Extenders | Hours to 50% Wearing |
|---|---|---|
| 1 | 10% Silicon Dioxide | 1,470 |
| 2 | 5% Titanium Dioxide | 2,395 |
| 3 | 10% Titanium Dioxide | 1,990 |
| 4 | 5% Carbon Black | 4,380 |
| 5 | 10% Carbon Black | 4,770 |

It is to be noted that while all of the extenders used were satisfactory in their weathering qualities, that carbon black gives the most desirable coating from the standpoint of long life.

EXAMPLE III

A quantity of type A resin was prepared and catalyzed with one percent oxalic acid. After mixing, the solution was sprayed over test specimens, in this case yellow pine posts, which had been treated so as to retain 43 lbs./ft.$^3$ of creosote. The resulting cured films had a thickness of 10 millimeters. The specimens were painted with a white house paint and exposed to the weather. After four years there is no evidence of creosote bleeding through the resin into the paint nor has the paint peeled, cracked or otherwise been affected.

What is claimed:

1. A creosote-treated wood product coated with a secondarily polymerized furfuryl alcohol resin which is prepared by catalytically further polymerizing a furfuryl alcohol polymer with a secondary catalyst, said resin coating being paintable.

2. A creosote-treated wood product coated with a secondarily polymerized furfuryl alcohol resin which is prepared by catalytically further polymerizing a furfuryl alcohol polymer with a secondary catalyst which is a member of the group consisting of phosphoric acid, hydrated oxalic acid and paratoluene sulfonic acid, said resin coating being paintable.

3. A creosote-treated wood product coated with a secondarily polymerized furfuryl alcohol resin, said resin being prepared by catalytically further polymerizing the furfuryl alcohol polymer with a secondary catalyst, said catalyst being a member of the group consisting of phosphoric acid, hydrated oxalic acid, and paratoluene sulfonic acid, said catalyst being present in an amount of from about 1.5 to 20 percent by weight of the said polymer, said resin coating being paintable.

4. A creosote-treated wood product coated with a secondarily polymerized furfuryl alcohol resin which is prepared by catalytically further polymerizing a furfuryl alcohol polymer with a secondary catalyst which is a member of the group consisting of phosphoric acid, hydrated oxalic acid and paratoluene sulfonic acid, said resin being extended with an inert filler.

5. A creosote-treated wood product coated with a secondarily polymerized furfuryl alcohol resin which is prepared by catalytically further polymerizing a furfuryl alcohol polymer with from about 1.5 to 20 percent by weight thereof of a secondary catalyst which is a member of the group consisting of phosphoric acid, hydrated oxalic acid, and paratoluene sulfonic acid, said resin being extended with an inert filler.

6. A painted, non-bleeding, creosote-treated wood product having an undercoat between the said creosote-treated wood and the said coating of paint, the said undercoat being a furfuryl alcohol resin secondarily catalyzed with a member of the group consisting of phosphoric acid, hydrated oxalic acid and paratoluene sulfonic acid.

References Cited in the file of this patent

UNITED STATES PATENTS

| 2,217,265 | Cislak | Oct. 8, 1940 |
| 2,584,681 | Dunlop | Feb. 5, 1952 |
| 2,601,497 | Brown | June 24, 1952 |
| 2,669,552 | Seymour et al. | Feb. 16, 1954 |
| 2,768,408 | Strigle et al. | Oct. 30, 1956 |